United States Patent Office 3,756,854
Patented Sept. 4, 1973

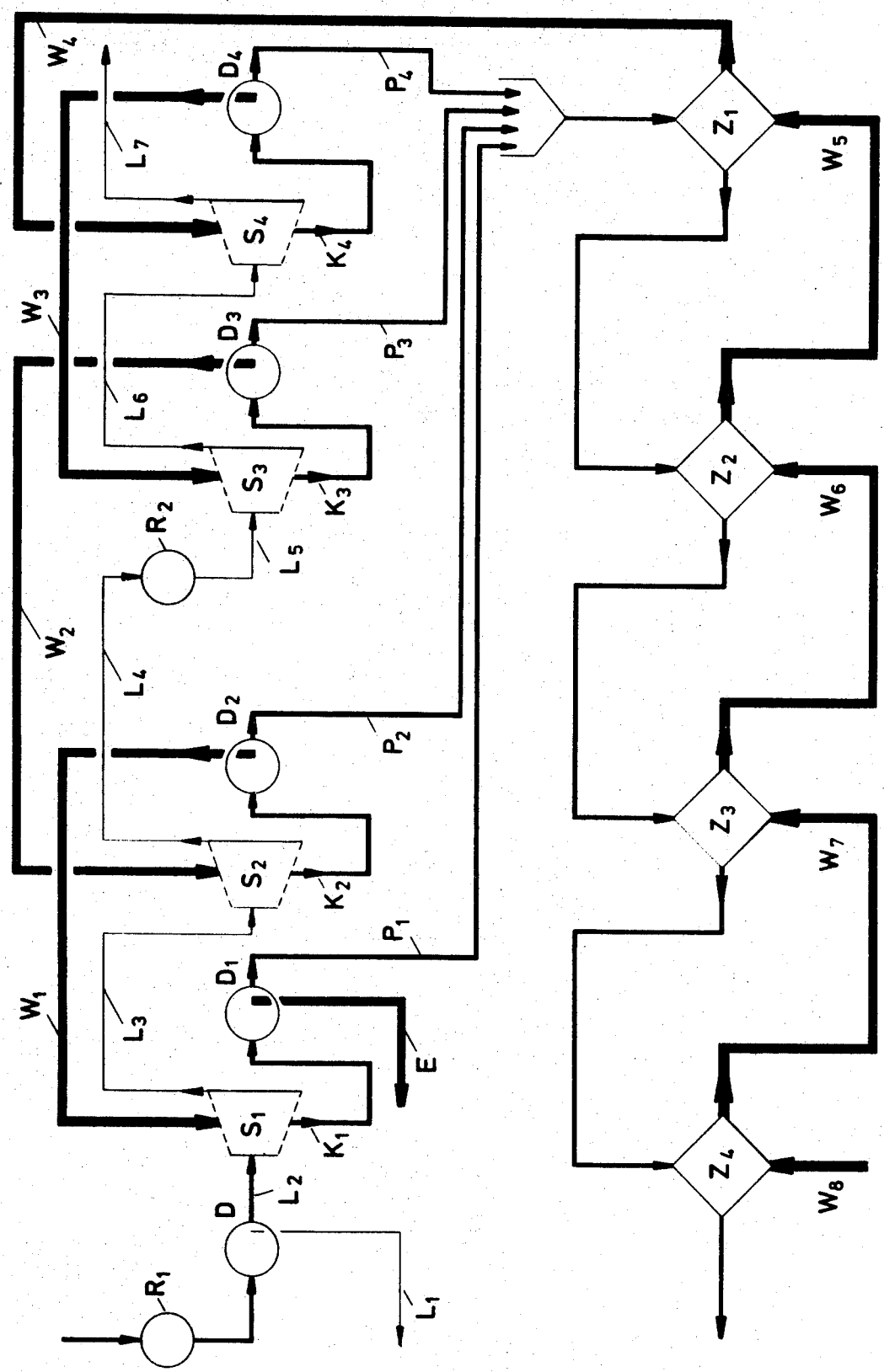

3,756,854
PROCESS AND PLANT FOR OBTAINING
STARCH FROM CROPS
Heinz Hemfort, Heinrich Huster, and Franz Heimeier, Oelde, Westphalia, Germany, assignors to Westfalia Separator AG, Oelde, Westphalia, Germany
Filed Apr. 22, 1971, Ser. No. 136,466
Claims priority, application Netherlands, Apr. 30, 1970, 7006416
Int. Cl. C13l 1/00
U.S. Cl. 127—24          4 Claims

ABSTRACT OF THE DISCLOSURE

Starchiferous material such as potatoes are pulped; starchiferous solids are separated and passed through a washing section in which starch is extracted with a liquid in a plurality of contacting stages; the liquid is passed through the washing section countercurrently with respect to the solids; and liquid from the washing section containing extracted starch is passed to refining section wherein the starch content thereof is enhanced. In at least some of the contacting stages, the liquid containing extracted starch, separated from the solids, before transfer to the next preceding contacting stage is centrifuged to separate a concentrated starch milk, and that milk is fed to the refining section from the washing section. In this way, the water load in the refining section is reduced.

BACKGROUND

The invention relates to obtaining starch from root crops which are ground in the presence of water while an effort is made to obtain the greatest possible percentage of the starch grains contained in the flesh of the root and to achieve an end product of a high degree of purity.

In order to obtain as nearly as possible all of the starch contained in the starting material, starch extracting plants contain several stages of extraction and, to achieve a high degree of purity, they contain several stages of refinement.

The extraction part of the plant comprises a first grind and a washing section consisting of several stages. In this washing section the grains of starch are washed out of the plant tissues, sometimes in conjunction with a second grind. The streams of starchy wash water thus produced are, according to one known process, combined and fed directly to the refining section of the plant. In the refining section is performed the separation of the finer solid impurities, the replacement of the remaining vegetable water which contains, dissolved protein, with fresh water, and the concentration of the thus purified starch milk.

Sieves are mainly used in the washing section of the plant for the separation of the starchy water from the plant tissues whereas centrifugal separators are preferred in the refining part for the purification and cencentration of the starch milk.

The proteins contained in solution in the vegetable water can cause a great amount of foaming, thereby greatly encumbering the entire operation. On the other hand, they spoil very rapidly and can thus substantially debase the quality of the end product.

To counter there disadvantages, in one process of the prior art the pulp from the first grind is delivered to a decanter equipped with a spiral ribbon solids remover which separates most of the vegetable water and the proteins dissolved therein from the solids which are composed of starch and vegetable tissue.

The vegetable water can be delivered to a protein recovery system or can be concentrated by evaporation.

Through the use of a decanter in this manner, which removes the solids in a relatively dry consistency, most of the protein is kept out of the washing and refining sections of the system.

The washing process in the individual stages is performed in one known process by suspending the solids in each stage in fresh water, passing the suspension through sieves and delivering the wash water to the refining section of the plant.

In this procedure, however, the water consumption is considerable. The great quantities of water involved very greatly encumber the refining section, on the one hand, and on the other hand governmental regulations prohibit discharging them untreated into the sewers. The purification or concentration of these large amounts of water would involve very great expense.

In order to obviate this difficulty at least in part, according to another known process the wash water used in the final stage, which contains relatively little starch, is re-used as wash water in a preceding stage.

It is also in the prior art to wash the vegetable tissues countercurrently. In this case fresh water is fed only to the final stage and then flows stage by stage through the washing section and, after passing through all stages, it is pumped to the refining section of the plant.

The first disadvantage of this process is that the starch content in the wash water increases from stage to stage, thereby increasingly imparing the washing effect. Another disadvantage consists in the fact that, after passing through the washing stages, all of the wash water is fed to the refining section of the plant, which here again is encumbered with huge quantities of water and the protein dissolved therein. Lastly, the fiber carried by the wash water is increasingly disintegrated by the repeated use of the wash water, thereby making its separation in the refining section difficult and even impossible.

The chief disadvantage of all of the processes described hitherto thus lies in the fact that a considerable amount of water containing dissolved protein and fibrous solids in addition to starch comes into the refining section from the washing section, so that the achievement of the highest possible purity in the end product can be achieved only at a very great cost.

THE INVENTION

It is the object of the invention to create an improved process for the production of starch, especially for plants on a large industrial scale, which requires a minimum of wash water, and in which only as such wash water passes from the washing section to the refining section as is necessary to maintain the fluidity of the starch.

The invention relates especially to that process for the production of starch from potatoes, manioc roots or the like, in which the pulp from the rasping machine is separated in a preliminary stage by means of a decanter into vegetable water and solids, the vegetable water is removed, the starch is washed out of the solids in a washing section consisting of a plurality of sieve stages, and is delivered to the refining section.

The process of the invention is characterized in that the wash water is fed countercurrently through the washing section of the plant, and the starch-containing wash water running from each sieve is separated by means of centrifugal separators into a concentrated starch milk and starch-free water, the concentrated starch milk is fed from each or at least several of the centrifugal separators to the refining section of the plant, and the starch-free water is delivered to the preliminary stage and, after passing through all the stages, is fed back to the input of the decanter of the preliminary stage, or it is united with the vegetable water separated from it, or it is carried out of the process separately.

In this manner, large quantities of wash water containing dissolved protein and finer solid particles are prevented from getting into the refining section of the plant. This makes the purification of the extracted starch considerably simpler, and a better quality is achieved in the end product. Furthermore, the water consumption is reduced to a minimum.

Since the starch content of the wash water running from the final sieve can be very slight, it can, under certain circumstances, be used again in a previous stage before it is delivered to the starch milk concentrating equipment. In such an embodiment, the last of the washing stages in the washing section, unlike the other washing stages does not include a centrifugal separator. Rather the liquid effluent of the last stage is fed directly to the next preceding stage, without first being passed through a centrifugal separator for removal of starch therefrom.

In further development of the invention, the wash water can also pass countercurrently through the entire plant. In this case the fresh water is to be fed into the final stage of the refining section and passes from the first stage of the refining section to the final stage of the washing section and then through the washing section to the first stage thereof.

Thus, the invention is concerned with a process for extracting starch from starchiferous raw material including the steps of shredding the raw material in the process of a liquid to form a pulp; separating the pulp into a liquid fraction rich in impurities and a solids fraction rich in starch and discharging the liquid fraction from the process; and passing the solids fraction through a washing section comprising a plurality of washing stages through which the solids fraction is serially passed, and wherein the solids fraction is washed in each of the stages with a washing liquid to extract starch therefrom, to provide a liquid effluent containing the extracted starch; and passing the liquid effluent through a refining section in which the starch is concentrated. According to the invention, in each of the washing stages, solids fraction is contacted with washing liquid, and following said contacting the solids fraction is separated from the washing liquid. The separated washing liquid from at least several of the washing stages preceding the last washing stage is centrifuged to provide a concentrated starch milk and washing liquid lean in starch in each stage wherein centrifuging is employed. The concentrated starch milk produced in each stage in which centrifuging is employed is passed to the refining section. The washing liquid lean in starch produced in each stage in which centrifuging is employed, and the washing liquid from the last washing stage, is passed to a previous washing stage for flow of washing liquid through the washing section countercurrent to the passage of the solids fraction therethrough.

In the refining section, the concentrated starch milk is combined with a liquid and then separated therefrom for the refining. In a preferred embodiment of the invention, the resulting separated liquid is used as washing liquid in the washing section.

THE DRAWING

The drawing is a diagram of an embodiment of the invention. The heavy lines are for washing liquid; the medium lines, for washing liquid containing extracted starch; the light lines for the solids.

The starting material is shredded in the presence of water in the rasping machine $R_1$. The pulp thus produced is separated in decanter D into vegetable water and solids. The vegetable water is carried out through line $L_1$ and can be further processed in a protein recovery system.

The solids removed from the decanter D, in a relatively dry consistency, consist of starch and vegetable cell tissue. They pass through line $L_2$ to a first washing stage comprising the first sieve $S_1$ where a first washing of the starch from the cell tissue is performed by means of the wash water brought in through line $W_1$. The solids left on sieve $S_1$ pass through line $L_3$ to a second washing stage comprising the second sieve $S_2$ on which a second washing takes place with the addition of water from the line $W_2$. In the example represented, the solids pass from sieve $S_2$ through line $L_4$ to a second rasping machine $R_2$. The re-comminuted solids are washed in two additional washing stages comprising respectively, sieves $S_3$ and $S_4$ with the addition of water from lines $W_3$ and $W_4$ and are finally carried out of the washing section through line $L_7$.

The starch-containing wash water flowing from sieve $S_1$ passes through line $K_1$ to the centrifugal separator $D_1$, of the first washing stage, which divides it into a concentrated starch milk; a washing liquid lean in starch, e.g. starch-free water. The starch-free water leaves the separator through the line E. It can be returned to the decanter D or to the rasping machine $R_1$, or it can be combined with the vegetable water running out through line $L_1$, or it can be removed separately from the process. The concentrated starch milk flows through line $P_1$ to the first separator $Z_1$ of the refinery section of the plant. Likewise, the starch-containing water passing through sieves $S_2$, $S_3$ and $S_4$ is separated in separators $D_2$, $D_3$ and $D_4$ into concentrated starch milk and starch-free water. The starch milk concentrated in these three stages flows through lines $P_2$, $P_3$ and $P_4$ also to separator $Z_1$.

The starch-free water emerging from the separators $D_4$, $D_3$ and $D_2$ serves as washing liquid in the washing section and flows through the wash stages countercurrently.

The extraction section of the plant with sieves $S_1$ to $S_4$ can be operated countercurrently by itself. In this case fresh water is fed through line $W_4$.

In the embodiment, the entire plant operates countercurrently. The fresh water is delivered to the final refining separator $Z_4$ through line $W_8$, flows countercurrently to the starch being refined through separators $Z_4 \ldots Z_1$ and from separator $Z_1$ it is transferred to the final sieve $S_4$ of the washing section.

After passing through sieves $S_3 \ldots S_1$ countercurrently, the wash water is carried out through line E.

In the process of the invention, only enough wash water passes from the extraction section to the refining section of the plant to maintain the fluidity of the starch milk.

The countercurrent flow of the wash water keeps the proteins dissolved in it and the fine solid particles suspended in it from getting into the refining section of the plant. Therefore a high quality can be achieved in the end product at lower cost. The yield of protein, if protein recovery is performed, is increased by the combining of the wash water with the vegetable water.

In the final washing stage of the washing section, composed as shown of sieve $S_4$ and centrifugal separator $D_4$, if desired, due to the low concentration of starch in the water in line $K_4$, the separator $D_4$ can be omitted, i.e. line $K_4$ can be connected to line $W_3$.

Conditions not described herein, such as temperature of the various streams, can be as is known for the aforementioned prior art processes.

What is claimed is:

1. In a process for extracting starch from starchiferous raw material including the steps:
    (a) shredding the raw material in the presence of a liquid to form a pulp,
    (b) separating the pulp into a liquid fraction rich in impurities and a solids fraction rich in starch and discharging the liquid fraction,
    (c) passing the solids fraction through a washing section comprising at least three washing stages through which the solids fraction is serially passed, and wherein the solids fraction is washed in each of said stages with a washing liquid to extract starch therefrom, providing a liquid effluent containing the extracted starch,
    (d) passing said liquid effluent through a refining section in which the starch is concentrated, the improvement which comprises:
  (e) in each of said washing stages, contacting the solids fraction with the washing liquid and following said contacting separating the solids fraction from the washing liquid, centrifuging the separated washing liquid from at least several of the washing stages preceding the last washing stage to provide a concentrated starch milk and washing liquid lean in starch in each stage wherein centrifuging is employed,
  (f) passing the concentrated starch milk produced in each stage in which centrifuging is employed to the refining section,
  (g) passing the washing liquid lean in starch produced in each stage in which centrifuging is employed, and washing liquid from the last washing stage to a previous washing stage for flow of washing liquid through the washing section countercurrent to the passage of the solids fraction therethrough.

2. Process according to claim 1, further comprising, in the refining section, combining the starch milk with a liquid, separating the resulting mixture into a fraction of enhanced starch content and a liquid component and transferring the separated liquid component to the washing section for use as the washing liquid.

3. In a plant suitable for extracting starch from starchiferous raw material comprising:
  (a) means for shredding the raw material in the presence of a liquid to form a pulp,
  (b) means for separating the pulp into a liquid fraction and a solids fraction,
  (c) a washing section, and means for introducing the solids fraction and a washing liquid for extracting starch from the solids fraction, into the washing section, said washing section comprising at least three washing stages interconnected for countercurrent flow of the solids fraction and washing liquid through the washing section and means for discharging the washed solids from the washing section,
  (d) a refining section for refining washing liquid containing extracted starch produced in washing section, to enhance the starch content thereof, and section transfer means interconnecting the washing section and refining section for transfer of washing liquid containing extracted starch from the washing section to the refining section,
  (e) each of said washing stages comprising means for contacting the solids fraction and washing liquid fed thereto, and means for separating the resulting mixture into solids fraction for transfer to the next succeeding stage and a washing liquid for transfer to the next preceding stage,
the improvement which comprises:
  (f) in each washing stage preceding the last washing stage, means for centrifuging the separated washing liquid produced therein to provide a concentrated starch milk and washing liquid lean in starch, said section transfer means of (d) transfering the concentrate starch milk from said centrifugal separators to the refining section, said interconnection of the washing section for countercurrent flow of (c) receiving the washing liquid lean in starch from said centrifugal separators and receiving washing liquid from the last washing stage and conveying the washing liquid in the washing section for said countercurrent flow.

4. Plant according to claim 3, wherein the refining section comprises means for combining the concentrated starch milk with a liquid, means for separating the resulting mixture into a fraction of enhanced starch content and a liquid component, and means interconnecting the refining section and the washing section for transfer of said liquid component to the washing section for use as the washing liquid therein.

References Cited
UNITED STATES PATENTS

| | | | |
|---|---|---|---|
| 3,079,283 | 2/1963 | Dreissen | 127—25 X |
| 2,974,068 | 3/1961 | Fontein | 127—24 X |

MORRIS O. WOLK, Primary Examiner

S. MARANTZ, Assistant Examiner

U.S. Cl. X.R.

23—270 R; 127—25, 69